(12) United States Patent
Morimoto et al.

(10) Patent No.: US 7,974,179 B2
(45) Date of Patent: Jul. 5, 2011

(54) TRANSMITTING APPARATUS AND METHOD WHICH TRANSMIT SYMBOLS IN OFDM AND RECEIVING APPARATUS AND METHOD FOR USE WITH OFDM COMMUNICATIONS

(75) Inventors: Akihito Morimoto, Yokohama (JP);
Yoshihisa Kishiyama, Yokosuka (JP);
Nobuhiko Miki, Yokohama (JP);
Kenichi Higuchi, Saitama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/857,003

(22) Filed: Aug. 16, 2010

(65) Prior Publication Data

US 2010/0310025 A1  Dec. 9, 2010

Related U.S. Application Data

(62) Division of application No. 12/298,996, filed as application No. PCT/JP2007/058519 on Apr. 19, 2007, now Pat. No. 7,961,699.

(30) Foreign Application Priority Data

May 1, 2006  (JP) .................................. 2006-127986

(51) Int. Cl.
*H04J 11/00* (2006.01)
(52) U.S. Cl. ........................................ 370/208; 370/430
(58) Field of Classification Search .......... 370/203–211, 370/430
See application file for complete search history.

(56) References Cited

U.S. PATENT DOCUMENTS

| 2005/0259622 A1 | 11/2005 | Czaja et al. |
| 2006/0172704 A1 | 8/2006 | Nishio et al. |
| 2007/0070944 A1* | 3/2007 | Rinne et al. ................... 370/329 |

(Continued)

FOREIGN PATENT DOCUMENTS

JP  11-284597 A  10/1999

(Continued)

OTHER PUBLICATIONS

NTT DoCoMo et al., 3GPP TSG RAN WG1 Meeting #45 R1-061189, May 2006, Internet <URL:http://www.3gpp.org/ftp/tsg_ran/WG1_RL1/TSGR1_45/Docs/R1-061189.zip>, 11 pages.

(Continued)

*Primary Examiner* — Ayaz R Sheikh
*Assistant Examiner* — Mounir Moutaouakil
(74) *Attorney, Agent, or Firm* — Osha • Liang LLP

(57) ABSTRACT

A transmitting apparatus which transmits a transmit symbol in orthogonal-frequency division multiplexing (OFDM) is disclosed. The transmitting apparatus includes a unit which provides a unicast channel; a unit which provides a multimedia broadcast multicast service (MBMS) channel; a unit which provides a specific pilot channel which is specific to a specified cell; a unit which provides one or more common pilot channels common to a plurality of cells; and a multiplexing unit which multiplexes the unicast channel, the MBMS channel, the specific pilot channel, and the one or more common pilot channels, and creates the transmit symbol, wherein the multiplexing unit time-division multiplexes, in the same frequency band, a unicast frame which includes the unicast channel, and an MBMS frame which includes the MBMS channel, and wherein an insertion density of the common pilot channel included in the MBMS frame is larger than an insertion density of the specific pilot channel included in the unicast frame.

4 Claims, 14 Drawing Sheets

U.S. PATENT DOCUMENTS

| | | | |
|---|---|---|---|
| 2008/0205322 A1* | 8/2008 | Cai et al. | 370/312 |
| 2009/0004971 A1* | 1/2009 | Dateki et al. | 455/62 |
| 2009/0016254 A1* | 1/2009 | Lee et al. | 370/312 |
| 2009/0225895 A1* | 9/2009 | Sheu et al. | 375/295 |
| 2009/0245399 A1* | 10/2009 | Lee et al. | 375/260 |
| 2009/0296925 A1* | 12/2009 | Kishiyama et al. | 380/33 |
| 2010/0002617 A1* | 1/2010 | Seyama | 370/312 |
| 2010/0172286 A1* | 7/2010 | Yoshii et al. | 370/328 |
| 2010/0177688 A1* | 7/2010 | Kishiyama et al. | 370/328 |

FOREIGN PATENT DOCUMENTS

| | | |
|---|---|---|
| TW | I292673 | 1/2008 |
| WO | 2005/015797 A1 | 2/2005 |
| WO | 2005/060298 A1 | 6/2005 |

OTHER PUBLICATIONS

NTT DoCoMo et al., 3GPP TSG RAN WG1 Meeting Ad Hoc LTE R1-060035, Jan. 2006, Internet <URL:http://www.3gpp.org/ftp/tsg_ran/WG1_RL1/TSGR1_AH/LTE_AH_January-06/Docs/R1-060035.zip>, 4 pages.

NTT DoCoMo et al., 3GPP TSG RAN WG1 Meeting #44 R1-060304, Feb. 2006, Internet <URL:http://www.3gpp.org/ftp/tsg_ran/WG1_RL1/TSGR1_44/Docs/R1-060304.zip>, 5 pages.

Nokia, 3GPP TSG RAN WG1 Meeting #47 R1-063367, Nov. 2006, Internet <URL:http://www.3gpp.org/ftp/tsg_ran/WG1_RL1/TSGR1_47/Docs/R1-063367.zip>, 6 pages.

T. Ohtsu, "Challenge to Systems Beyond IMT-2000"~Approach in wireless ~, ITU Journal vol. 33, No. 3, pp. 26-30, Mar. 30, 2003, w/translation, 11 pages.

Written Opinion issued in PCT/JP2007/058519, mailed on Jun. 26, 2007, 5 pages.

International Search Report issued in PCT/JP2007/058519, mailed on Jun. 26, 2007, with translation, 5 pages.

Huawei, "Further consideration on multiplexing of unicast and MBMS", Jan. 23, 2006, 4 pages, Tdoc R1-060235.

Qualcomm Europe, On pilot structure for OFDM based E-UTRA downlink multicast, Nov. 7, 2005, 5 pages, R1-051490.

Huawei, "Multiplexing of multicast/broadcast and unicast services", Nov. 7, 2005, 2 pages, R1-051431.

Nokia, "Cell search procedure for initial synchronization and neighbour cell identification", Nov. 7, 2005, 6 pages, R1-051549.

LG electronics, MBMS transmission in E-UTRA, Nov. 7, 2005, 4 pages, R-051300.

U. S. Office Action issued for related U.S. Appl. No. 12/298,996, dated Aug. 18, 2010.

Japanese Office Action for Application No. 2009-164287, mailed on Jan. 4, 2010 (5 pages).

Toshiba Corporation, MBMS Structure for Evolved UTRA, 3GPP TSG RAN WG1 LTE Ad Hoc Meeting R1-060182, Jan. 23, 2006, pp. 1-6.

Japanese Office Action for Application No. 2009-292222, mailed on Jan. 4, 2010 (6 pages).

Texas Instruments, E-MBMS Reference Signal Structure, 3GPP TSG RAN WG1#44bis R1-060856, Mar. 27, 2006, pp. 1-9.

US Notice of Allowance issued in U.S. Appl. No. 12/298,996, mailed Feb. 7, 2011, 6 pages.

Taiwanese Office Action for Application No. 096114388, mailed on Mar. 2, 2011 (6 pages).

* cited by examiner

PRIOR ART

| MCS NO. | DATA MODULATION | CHANNEL CODING RATE | RELATIVE INFORMATION RATE |
|---------|-----------------|---------------------|---------------------------|
| MCS1    | QPSK            | 1/3                 | 1                         |
| MCS2    | QPSK            | 1/2                 | 1.5                       |
| MCS3    | QPSK            | 2/3                 | 2                         |
| MCS4    | QPSK            | 6/7                 | 2.57                      |
| MCS5    | 16QAM           | 1/2                 | 3                         |
| MCS6    | 16QAM           | 2/3                 | 4                         |
| MCS7    | 16QAM           | 3/4                 | 4.5                       |
| MCS8    | 16QAM           | 5/6                 | 5                         |
| MCS9    | 16QAM           | 6/7                 | 5.24                      |
| MCS10   | 16QAM           | 8/9                 | 5.33                      |

BETTER RECEIVE SIR ↓

1 SUBFRAME

TIME

TRANSMITTING APPARATUS AND METHOD WHICH TRANSMIT SYMBOLS IN OFDM AND RECEIVING APPARATUS AND METHOD FOR USE WITH OFDM COMMUNICATIONS

CROSS-REFERENCE TO RELATED APPLICATIONS

The present application is a divisional application of U.S. patent application Ser. No. 12/298,996, filed Oct. 29, 2008.

BACKGROUND OF THE INVENTION

1. Field of the Invention

The present invention relates generally to a technical field of wireless communications and more specifically to apparatuses and methods which transmit and receive a multimedia-broadcast multicast service (MBMS) channel.

2. Description of the Related Art

In next-generation mobile communications systems in which video and data communications are primarily conducted, capabilities far surpassing those of the third generation mobile communications system (IMT-2000) are called for, necessitating a sufficient realization of broadband, and increased capacity and speed in communications. Therefore, various outdoor and indoor communications surroundings are envisaged. In downlink data transmissions, not only a unicast scheme, but also multicast and broadcast schemes are conducted. More specifically, an increasing importance has been placed on transmitting an MBMS channel in recent years. The MBMS channel includes multimedia information broadcast to a large number of specified or unspecified users, and may include voice, character, still and video image, and various other content. (See Non-patent document 1, for example, for trends in future communications system.)

On the other hand, in a wideband mobile communications system, effects of frequency-selective fading due to a multipath environment becomes prominent. Thus, an orthogonal-frequency division multiplexing (OFDM) scheme holds promise as a next-generation communications scheme. In the OFDM scheme, a guard interval portion is appended to an effective symbol portion including information to be transmitted to form a symbol, a plurality of which symbols are transmitted during a predetermined transmission time interval (TTI). Portions of information included in the effective symbol portion make up the guard interval portion. The guard interval portion is also called a cyclic prefix (CP) or an overhead.

On the other hand, unlike the unicast channel, the MBMS channel of the same contents is transmitted from multiple cells. In principle, the unicast channel is transmitted to a specified user from one cell.

In "Area 1", as shown in FIG. 1, which includes three base stations BS1, BS2, and BS3, the same MBMS channel is transmitted. Such an area as described above may be called a MBMS area. Similarly, in "Area 2", which includes three base stations BS11, BS12, and BS13, the same MBMS channel is transmitted. The MBMS channels transmitted in Area 1 and Area 2, which are generally different, may be the same intentionally or accidentally. A mobile terminal (more generally, user equipment (UE), which includes mobile and fixed terminals) receives the MBMS channel of the same contents, which is transmitted from multiple cells. The received MBMS channel forms a large number of incoming waves or paths depending on the length of a radio propagation path. If the delay difference of the incoming waves falls within the range of the guard interval due to the characteristics of the OFDM symbol, the multiple incoming waves as described above may be combined without intersymbol interference (soft-combined), making it possible to improve the receive quality as a result of path-diversity effects. Therefore, a guard-interval length for the MBMS channel is set longer than a guard-interval length for the unicast channel.

Now, when a unicast channel is to be transmitted to a certain user apparatus, a cell-specific scrambling code is used for pilot, control, and unicast channels. Based on the received pilot channel, a user apparatus performs channel estimation and other processes, channel compensation for the control and unicast channels, and the subsequent modulating. A scrambling code, which differs from cell to cell, may be used to distinguish, from an interference signal from another cell, a desired signal. However, if the unicast channel is merely replaced by the MBMS channel (if the scrambling code which differs from cell to cell is used for transmitting the MBMS channel), the user apparatus has to perform the process as described above while identifying a signal from a surrounding base station (specifically, a pilot channel), which is difficult. From such a point of view as described above, it has been proposed to separately provide, for the MBMS, a scrambling code which is common to multiple cells included in the MBMS area (a common scrambling code). More specifically, a cell-specific scrambled code-multiplied pilot channel (a specific pilot channel), and a pilot channel which is common to multiple cells within a MBMS area (a common pilot channel) are provided, with the specific pilot channel being used for channel compensating a unicast channel, and the common pilot channel for channel compensating an MBMS channel.

Non-patent document 1: Otsu, "A challenge for systems beyond IMT-2000—a wireless approach", ITU Journal, Vol. 33, No. 3, pp. 26-30, Mar. 2003

As described above, for the MBMS channel, the same MBMS channel, which is transmitted from cells varying in distance from a user apparatus, are combined, so that the delay spread and the fluctuation in the frequency domain becomes larger than the same for the unicast channel. Thus, the channel estimation accuracy in the MBMS channel may deteriorate relative to the same for the unicast channel.

Moreover, unlike the unicast channel, the MBMS channel is transmitted to all user apparatuses using the same MCS (modulation and channel coding scheme), so that the MCS must be set to the worst user envisaged. For example, when a user apparatus is moving at high speed, the communications environment becomes worse. However, consideration must be given to ensure that the MBMS channel meets a required quality level even in such an environment as described above.

SUMMARY OF THE INVENTION

Problem(s) to be Solved by the Invention

The present invention is for overcoming at least one of the problems as described above, and aims to provide transmitting and receiving apparatuses and methods that seek to improve the receive quality of the MBMS channel.

Means for Solving the Problem

In the present invention, a transmitting apparatus is used which transmits a transmit symbol in the orthogonal-frequency division multiplexing (OFDM) scheme.

The transmitting apparatus includes a unit which provides a unicast channel; a unit which provides a multimedia broadcast multicast service (MBMS) channel; a unit which provides a specific pilot channel which is specific to a specified cell; a unit which provides one or more common pilot channels common to a plurality of cells; and a multiplexing unit which multiplexes the unicast channel, the MBMS channel, the specific pilot channel, and the one or more common pilot channels, and creates a transmit symbol, wherein the multiplexing unit time-division multiplexes, in the same frequency band, a unicast frame which includes the unicast channel, and an MBMS frame which includes the MBMS channel, and wherein an insertion density of the common pilot channel included in the MBMS frame is larger than an insertion density of the specific pilot channel included in the unicast frame.

Advantage of the Invention

The present invention makes it possible to improve the receive quality of the MBMS channel.

DESCRIPTION OF THE PREFERRED EMBODIMENTS

[Description of Notations]

Figure 1:
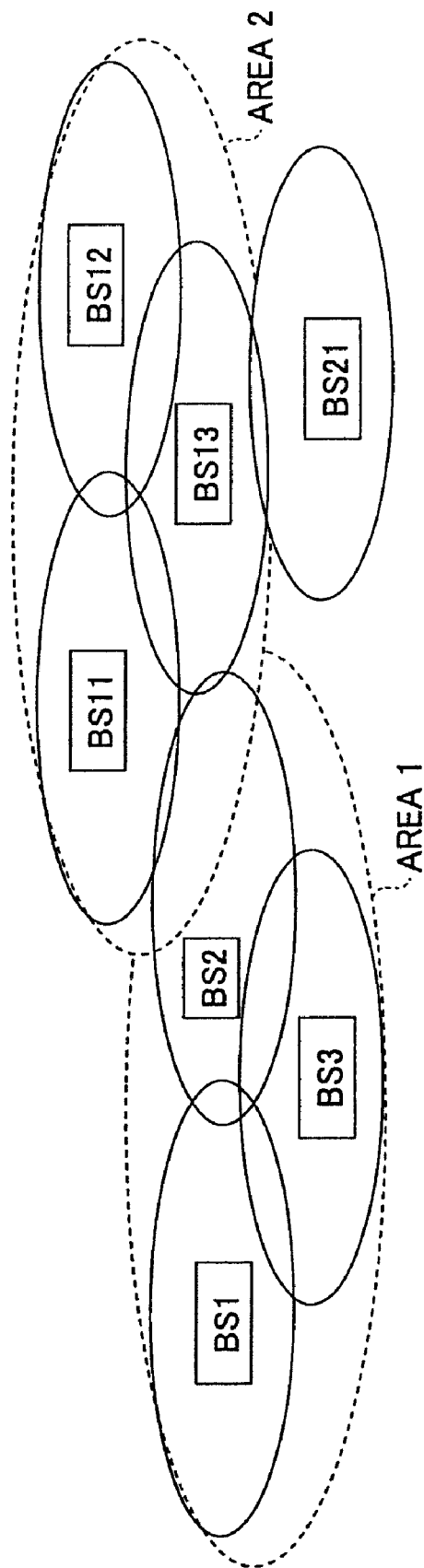
FIG. 1 is a diagram illustrating cells and MBMS areas.

11 MBMS processor; 12 unicast channel processor; 13 MCS setting section; 19 control channel processor; 14 first multiplexer; 15 serial/parallel converter (S/P); 16 second multiplexer (MUX); 17 inverse fast Fourier transformer (IFFT); 18 guard interval inserter; 20 radio-parameter setting section; 21, 22 scrambling-code multiplier; 23, 24 repeating section; 111 encoder; 112 data modulator; 113 interleaver; 114 scrambling-code multiplier; 121 encoder; 122 data modulator; 123 interleaver; 124 scrambling-code multiplier; 191 encoder; 192 data modulator; 193 interleaver; 194 scrambling-code multiplier; 520 symbol timing detector; 522 guard interval inserter; 524 fast Fourier transformer; 526 demultiplexer; 528 channel estimator; 530 channel compensator; 532 parallel/serial converter (P/S); 534 channel compensator; 536 deinterleaver; 538 turbo encoder; 540 Viterbi decoder; 542 radio-parameter setting section

BEST MODE OF CARRYING OUT THE INVENTION

A transmitting apparatus according to an embodiment of the invention includes a multiplexing unit which multiplexes a unicast channel, an MBMS channel, a specific pilot channel which is specific to a specified cell, and a common pilot channel which is common to multiple cells, and creates a transmit symbol. The multiplexing unit time-division multiplexes, in the same frequency band, a unicast frame which includes the unicast channel and an MBMS frame which includes the MBMS channel. The insertion density of the common pilot channel included in the MBMS frame is larger than the insertion density of the specific pilot channel included in the unicast channel.

In this case, the channel fluctuation tolerance in the time domain is stronger the larger the insertion density of the pilot channel in the time domain and weaker the smaller the insertion density of the pilot channel in the time domain. Also, the channel fluctuation tolerance in the frequency domain is stronger the larger the insertion density in the frequency domain and weaker the smaller the insertion density in the frequency domain.

In particular, from the point of view of increasing the channel fluctuation tolerance in the frequency domain, a common pilot channel may be mapped to at least one time slot for any sub-carrier. Moreover, at least a portion of a sub-carrier into which a common pilot channel is inserted in one time slot may differ from a sub-carrier into which a common pilot channel is inserted in another time slot.

Further, in particular, from the point of view of increasing the channel fluctuation tolerance in the time domain, a common pilot channel may be mapped to multiple time slots belonging to a sub-carrier. Moreover, at least one common pilot channel may be mapped for any time slot.

Moreover, the smaller the insertion density, lower the channel coding rate for channel coding used to transmit the same information-rate data, increasing the coding gain, thereby making it possible to improve the receive quality of the MBMS channel.

From the point of view of achieving uniformity in channel estimation accuracy, the common pilot channel may be mapped in equal frequency intervals. Moreover, the common pilot channel may be distributed uniformly within an MBMS frame taking up a predetermined band and a predetermined period.

From the point of view that a CQI for the unicast channel is measured even in a transmission period of the MBMS frame, a specific pilot channel in addition to the common pilot channel may be mapped to the MBMS frame.

From the point of view that the CQI is measured at a user apparatus without distinguishing the unicast frame from the MBMS frame, at least a portion of a specific pilot channel that is inserted into an MBMS frame may be inserted into a sub-carrier which is the same sub-carrier as a specific pilot channel which is inserted into a unicast frame.

From the point of view of increasing the receive-quality measuring accuracy while maintaining a battery-saving effect, a portion of a specific pilot channel that is inserted into an MBMS frame may be inserted into the same sub-carrier as a specific pilot channel which is inserted into a unicast frame, and another specific pilot channel may also be inserted into at least one time slot into which the portion of the specific pilot channel is inserted.

In an embodiment of the present invention, a receiving apparatus for use with an OFDM communications system is used. The receiving apparatus includes a unit which determines a first type of channel estimation value for each of at least one sub-carrier into which a specified pilot channel is inserted; a unit which determines a second type of channel estimation value for each of at least one sub-carrier into which a common pilot channel is inserted; and a unit which derives a non-desired signal component from the difference between a channel estimation value for a sub-carrier that is derived from one or more first type of channel estimation values, and a second type of channel estimation value for the sub-carrier, and derives a channel quality indicator (CQI) for the sub-carrier.

From the point of view of having the same locations and proportions for the specific-pilot channel taken up in a unicast frame and in a MBMS frame, the channel estimation value for the sub-carrier that is derived from the one or more first type of channel estimation values may be derived from the average value of multiple first type channel estimation values for different sub-carriers.

From the point of view of improving the accuracy of measuring the CQI, the non-desired signal component may be derived from the difference between a first type of channel estimation value and a second type of channel estimation value for the same sub-carrier.

Embodiment 1

In the embodiment below, while a system is explained which adopts the orthogonal frequency divisional multiplexing (OFDM) scheme for downlink, the present invention may be applied to other multi-carrier systems.

Figure 2:
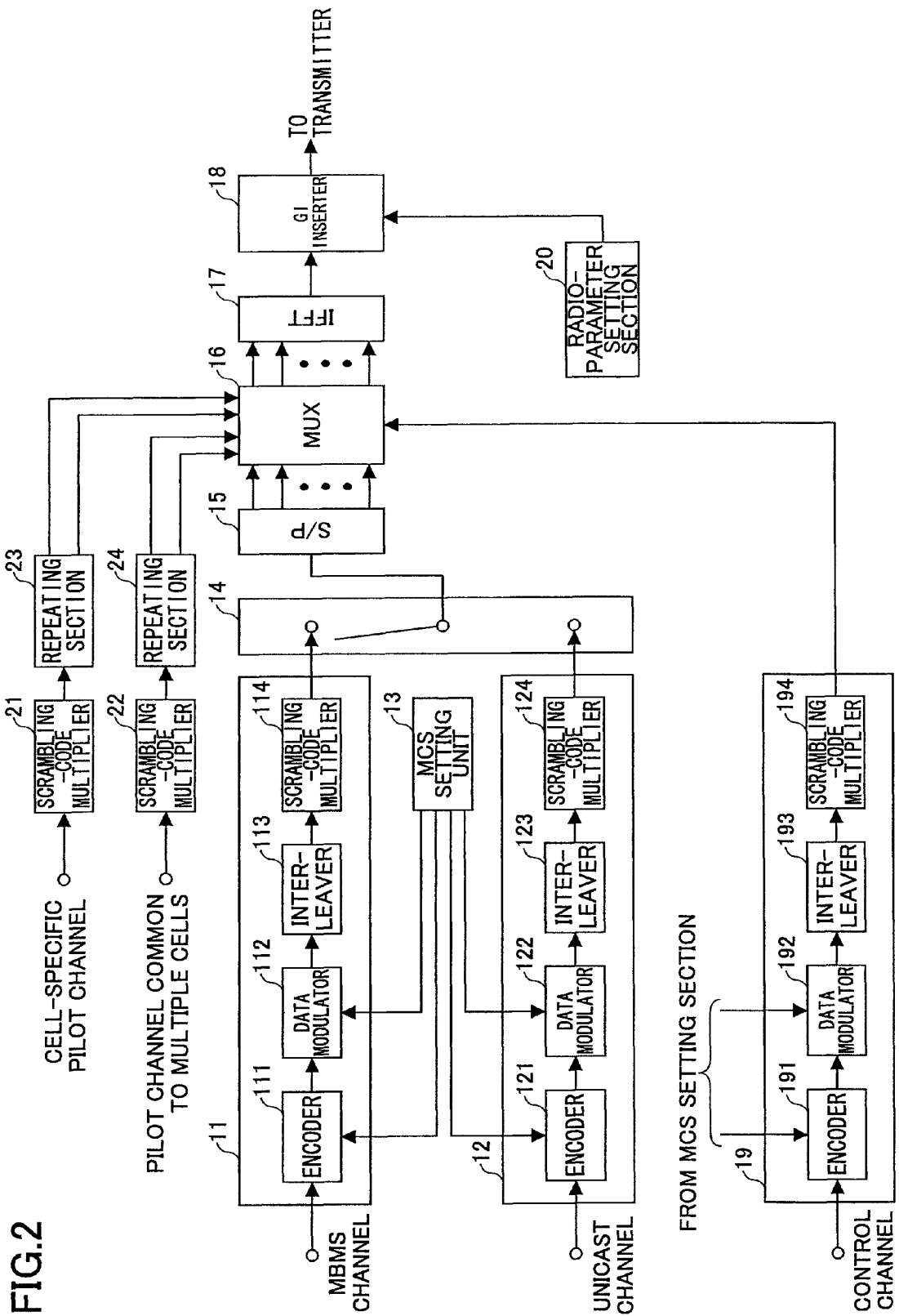
FIG. 2 is a block diagram illustrating a transmitter according to an embodiment of the present invention.

FIG. 2 is a schematic block diagram of a transmitter according to an embodiment of the present invention. While the transmitter is typically provided at a base station, as in the present embodiment, it may be provided at another apparatus. FIG. 2, which illustrates the transmitter, shows an MBMS processor 11, a unicast channel processor 12, an MCS setting section 13, a control channel processor 19, a first multiplexer 14, a serial/parallel converter (S/P) 15, a second multiplexer (MUX) 16, an inverse fast Fourier transformer (IFFT) 17, a guard interval inserter 18, a radio-parameter setting section 20, a scrambling code multiplier 21, 22, and repeating sections 23, 24. The MBMS processor 11 includes an encoder 111, a data modulator 112, an interleaver 113, and a scrambling code multiplier 114. The unicast channel processor 12 includes an encoder 121, a data modulator 122, an interleaver 123, and a scrambling code multiplier 124. The control channel processor 19 includes an encoder 191, a data modulator 192, an interleaver 193, and a scrambling code multiplier 194.

The MBMS processor 11 performs processing related to multimedia broadcast multicast service (MBMS). An MBMS channel includes multimedia information broadcast to a large number of specified or unspecified users, and may include voice, character, still and video image, and various other contents.

The encoder 111 performs channel coding in order to increase the error tolerance of the MBMS channel. Coding may be performed using various schemes such as convolutional coding and Turbo coding that are well known in the art. The data modulator 112 data modulates the MBMS channel using any appropriate modulation scheme such as QPSK, 16QAM, or 64QAM. The channel coding rate and/or modulation scheme may be fixed, and/or changed according to instructions from the MCS setting section 13. Unlike the unicast channel, the MBMS channel is not optimally set for each individual user, but is set such that the MCS therefor is determined such that all users can receive at a predetermined quality (such that even a fast-moving user apparatus can receive properly).

The interleaver 113 rearranges the sequential order of data included in the MBMS channel according to a predetermined pattern.

The scrambling-code multiplier 114 multiplies a scrambling code. In the present embodiment, a scrambling code which is common to multiple cells belonging to the same MBMS area is multiplied. As described above, in the present embodiment, a scrambling code which differs from one cell to another is provided for a unicast channel, and a different scrambling code which is common to multiple cells in an MBMS area is provided for an MBMS channel.

The unicast channel processor 12 performs processing related to a channel for a specified (typically one) user.

The encoder 121 performs coding in order to increase the error tolerance of the unicast channel. Coding may be performed using various schemes such as convolutional coding and Turbo coding that are well known in the art. In the present embodiment, AMC (adaptive modulation and coding) control is performed with respect to the unicast channel, with the channel coding rate being changed adaptively according to instructions from the MCS setting section 13.

The data modulator 122 data modulates the unicast channel using any appropriate modulation scheme such as QPSK, 16QAM, or 64QAM. In the present embodiment, AMC control is performed with respect to the unicast channel, with the modulation scheme being changed adaptively according to instructions from the MCS setting section 13.

The interleaver 123 rearranges the sequential order of data included in the unicast channel according to a predetermined pattern.

The scrambling code multiplier 124 multiplies a scrambling code. The scrambling code varies from one cell to another.

The control channel processor 19 performs processing related to a control channel for a specified (typically one) user.

The encoder 191 performs coding for increasing the error tolerance of the control channel. Coding may be performed using various schemes such as convolutional coding and Turbo coding that are well known in the art.

The data modulator 192 data modulates the control channel using any appropriate modulation scheme such as QPSK, 16QAM, or 64QAM. With respect to the control channel, the demand for high-speed transmission is not strong, but rather the demand for reliability is strong, therefore the AMC control is not performed in the present embodiment.

The interleaver 193 rearranges the sequential order of data included in the control channel according to a predetermined pattern.

The scrambling code multiplier 194 multiplies a scrambling code which differs from one cell to another.

The MCS setting section 13 instructs each processing element to change, as required, a combination of a modulation scheme and an coding rate that is used for the MBMS channel, and a combination of a modulation scheme and an coding rate that is used for the unicast channel. The combination of the modulation scheme and the coding rate is specified by a number (an MCS number), which indicates what the combination is.

Figures 3, 4:
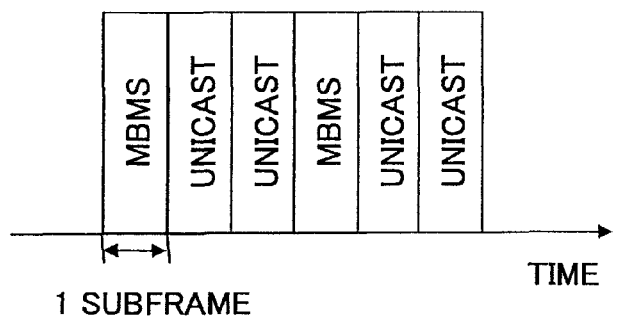
FIG. 3 is a diagram illustrating exemplary combinations of data modulation schemes and channel coding rates.
FIG. 4 is a diagram illustrating how unicast and MBMS channels are time-multiplexed.

FIG. 3 illustrates exemplary combinations of data modulation schemes and channel coding rates. As shown, relative information rates are shown, which are successively assigned MCS numbers in ascending order thereof. The AMC control is designed to adaptively change either or both of the modulation scheme and the coding rate according to how good the channel condition is to achieve a quality required at the receiver. How good the channel condition is may be evaluated by a received quality (a received SIR) of a downlink pilot channel. Performing the AMC control makes it possible to improve reliability with respect to a user with a worse channel condition to achieve a required quality and to improve throughput while maintaining a required quality with respect to a user with a better channel condition.

As shown in FIG. 4, the first multiplexer 14 in FIG. 2 time-division multiplexes the MBMS and unicast channels in the same frequency band.

The serial-to-parallel (S/P) converter 15 converts a serial signal sequence (stream) to a parallel signal sequence. The number of parallel signal sequences may be determined in accordance with the number of sub-carriers.

The second multiplexer (MUX) 16 multiplexes multiple data sequences which represent an output signal from the first multiplexer 14 and the pilot and/or broadcast channels. The multiplexing may be performed by any one scheme of time multiplexing, frequency multiplexing, or time and frequency multiplexing. Examples of mapping common pilot channels to MBMS channels are explained in detail with reference to FIGS. 5A to 5H.

The inverse fast Fourier transformer (IFFT) 17 inverse fast Fourier transforms a signal input thereto, and modulates the signal using OFDM.

The guard interval inserter 18 appends a guard interval (portion) to an OFDM-modulated symbol to create a transmit symbol. As is well known, a series of data including head data of a symbol to be transmitted is replicated to create the guard interval, which is appended to the tail thereof to create a transmit symbol. Alternatively, a series of data including tail data of a symbol to be transmitted is replicated to create the guard interval, which is appended to the head thereof to create a transmit symbol.

The radio-parameter setting section 20 sets radio parameters used in communications. The radio parameter (group), which includes information specifying the format of an OFDM symbol, may include a group of information items specifying values such as a guard interval period $T_{GI}$, an effective symbol period, a proportion of one symbol that is taken up by the guard interval, and sub-carrier interval Delta f. The effective symbol period is equal to the inverse of the sub-carrier interval, or 1/Delta f.

The radio-parameter setting section 20 sets appropriate radio parameter groups according to the communications condition or in response to instructions from other apparatuses. The radio-parameter setting section 20 may make proper use of the radio parameter groups to be used, according to whether what is transmitted is a unicast channel or an MBMS channel. For example, a radio parameter group specifying a shorter guard interval may be used for the unicast channel, while a radio parameter group specifying a longer guard interval may be used for the MBMS channel. The radio-parameter setting section 20 may compute and derive an appropriate radio parameter group each time, or multiple sets of radio parameter groups may be stored in a memory in advance, whereby a set out of these sets may be selected as needed.

The scrambling-code multiplier 21 multiplies a scrambling code to a pilot channel input thereto, and generates a specific pilot channel. The scrambling code as described above is a scrambling code which is specific to a cell such that it differs from one cell to another cell (a specific scrambling code).

The scrambling code multiplier 22 multiplies a scrambling code to a pilot channel input thereto, and generates a common pilot channel. The scrambling code as described above is a scrambling code which is common to multiple cells (a common scrambling code). The pilot channels input to the scrambling multipliers 21, 22 may be the same or different.

The repeating sections 23, 24 replicate data input thereto and output the data. The number of replications may be changed as needed. In the present embodiment, the number of replications for the common pilot channel is set larger than the number of replications for the specific pilot channel.

The MBMS channel input to the MEMS processor and the unicast channel input to the unicast channel processor in FIG. 2 are channel coded and data modulated in appropriate coding rate and modulation scheme which are designated by the individual MCS number, and are, respectively, time-multiplexed after interleaving. Time multiplexing may be performed in various units of time, for example in units of radio frames, or in units of subframes which make up a radio frame. FIG. 4 is an example illustrating time-multiplexing in units of subframes. One subframe includes multiple OFDM symbols. As an example, a subframe may be equal to a transmission time interval (TTI) such as 0.5 ms, for example. Alternatively, time multiplexing may be performed not in units of subframes, but in units of radio frames, such as 10 ms, for example. These numerical value examples are merely exemplary, thus, time multiplexing may be performed in units of various time periods. An identifier such as a subframe or a radio frame is for convenience only, merely representing an amount indicating some unit of time. For convenience of explanation, a subframe in which a unicast channel is transmitted is referred to as a unicast frame, while a subframe in which an MBMS channel is transmitted is referred to as an MBMS frame.

The time-multiplexed channels are multiplexed with the pilot channels, after which the multiplexed channels are inverse fast Fourier transformed and OFDM-modulated. The modulated symbol is appended to a guard interval to output a baseband OFDM symbol, which is converted to an analog signal, which is wirelessly transmitted via a transmitting antenna.

FIGS. 5A-5H show various specific examples of mapping common pilot channels to MBMS frames. For brevity of illustration, other channels such as the control channel, etc., are not shown in FIGS. 5A-5H. Such MBMS frames as described above are time-multiplexed with the unicast frame to form a radio frame, which is transmitted from each base station to a mobile station. An MBMS frame includes multiple time slots; as shown the MBMS frame (one subframe) includes six time slots (six OFDM symbols). In the explanation below, $N_s$ represents the number of time slots into which the common pilot channels are inserted. Delta f expresses, in number of OFDM symbols, an insertion interval (a frequency interval) of the common pilot channel in the frequency domain. The numerical value examples are merely exemplary, thus, any appropriate numerical value may be used. For convenience of illustration, one OFDM symbol is shown as being all taken up by pilot channels, which is not essential to the present invention. Information representing one pilot channel may be mapped to a portion of an OFDM symbol, or to multiple OFDM symbols, according to the symbol length, the bandwidth taken up by the symbol, and the amount of pilot channel information. This may apply not only to the common pilot channel, but also to the specific pilot channel.

In general, the stronger the channel fluctuation tolerance in the time domain the larger the $N_s$ while the weaker the tolerance the smaller the $N_s$. The stronger the channel fluctuation tolerance in the frequency domain the smaller the Delta f while the weaker the tolerance the larger the Delta f. From the point of view of improving the channel estimation accuracy and the receive quality for the pilot channel, it is desirable to increase the number of pilot channels, which causes a proportion of a pilot channel within the MBMS frame (an overhead: OH) to become large. In other words, from the point of view of data transmission efficiency, it is desirable for the number of insertions of the pilot channel to be smaller. Thus, in the actual system, it is desirable to appropriately map the pilot channel taking into account such tradeoff as described above.

Figure 5A:
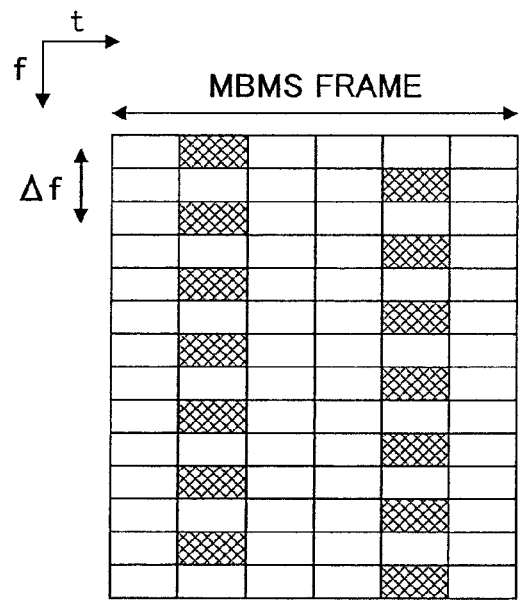
FIG. 5A is a diagram illustrating an example of mapping a common pilot channel to an MBMS frame, where Ns=2, Delta f=2, and OH=16.7%.

In an example shown in FIG. 5A, $N_s$=2, Delta f=2, and OH=16.7%. In the example shown, common pilot channels are mapped in second and fifth time slots in narrow frequency intervals. Moreover, common pilot channels are inserted into the second and fifth time slots such that they alternately intertwine on the frequency axis, so that the common pilot channels are inserted into all sub-carriers as a whole MBMS frame. Therefore, the illustrated example is desired from the point of view of increasing the tolerance in fluctuation in the frequency domain.

Figure 5B:
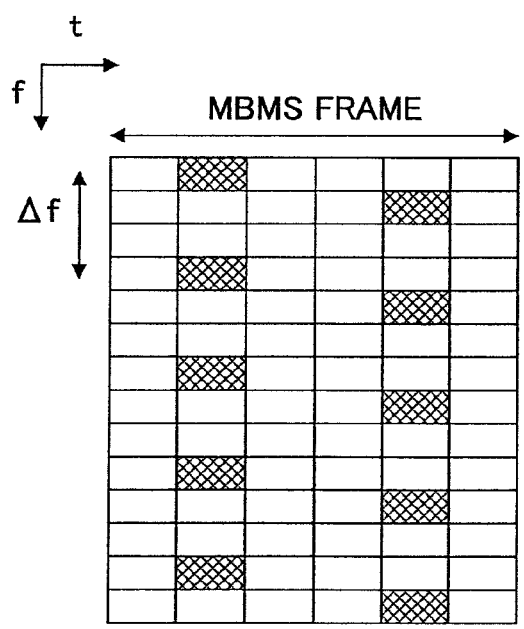
FIG. 5B is a diagram illustrating an example of mapping a common pilot channel to an MBMS frame, where Ns=2, Delta f=3, and OH=11.1%.

In an example shown in FIG. 5B, $N_s$=2, Delta f=3, and OH=11.1%. While a large number of common pilot channels are inserted in the frequency domain in the present example shown, as in the case of FIG. 5A, the frequency interval of the common pilot channel is relatively larger. Thus, the number of common pilot channels inserted into the MBMS frame is smaller. The present example shown is desirable from the point of view of decreasing overhead while keeping the tolerance to fluctuation in the frequency domain relatively high.

Figure 5C:
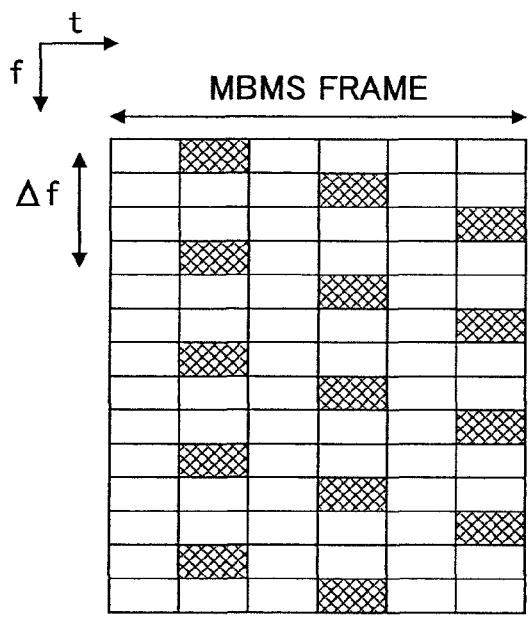
FIG. 5C is a diagram illustrating an example of mapping a common pilot channel to an MBMS frame, where Ns=3, Delta f=3, and OH=16.7%.

In an example shown in FIG. 5C, $N_s$=3, Delta f=3, and OH=16.7%. In the present example shown, the common pilot channels are inserted into all sub-carriers as a whole MBMS frame, as in the case of FIG. 5A. Compared to the case in FIG. 5A, the frequency interval of the common pilot channel is larger, but the number of time slots into which the common pilot channel is inserted is longer. Therefore, the illustrated example is desirable from the point of view of increasing the tolerance in fluctuation not only in the frequency domain, but also in the time domain.

Figure 5D:
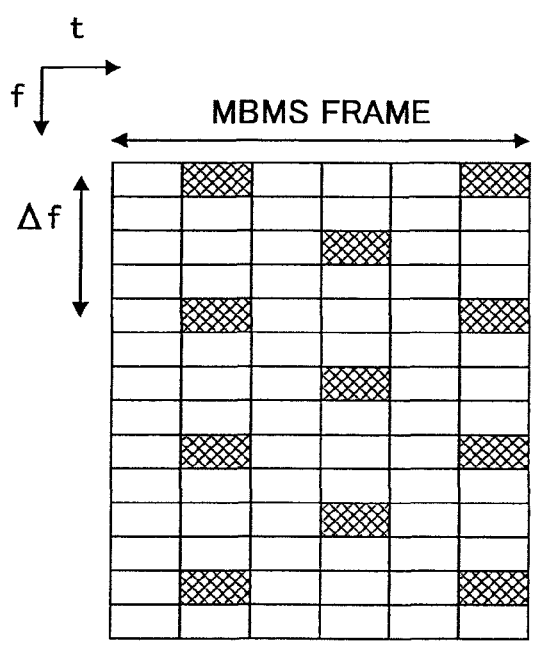
FIG. 5D is a diagram illustrating an example of mapping a common pilot channel to an MBMS frame, where Ns=3, Delta f=4, and OH=12.5%.

In an example shown in FIG. 5D, $N_s$=3, Delta f=4, and OH=12.5%. While a large number of common pilot channels are inserted in the frequency domain in the present example shown, as in the case of FIG. 5C, the frequency interval of the common pilot channel is relatively larger. Thus, the number of common pilot channels inserted into the MBMS frame is smaller. The present example shown is desirable from the point of view of decreasing overhead while keeping the tolerance to fluctuation in the time and frequency domains relatively high.

Figure 5E:
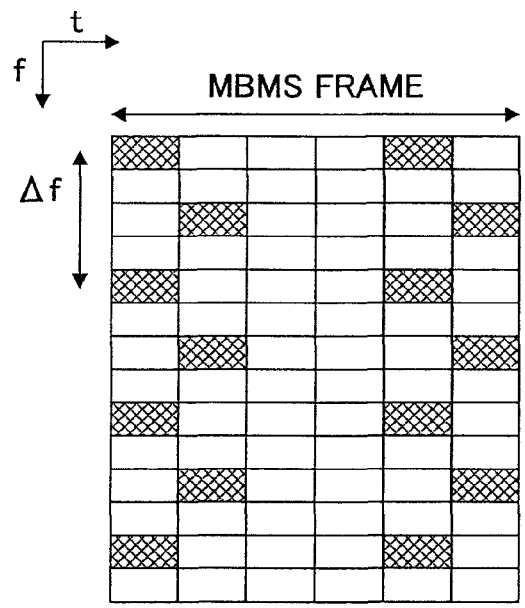
FIG. 5E is a diagram illustrating an example of mapping a common pilot channel to an MBMS frame, where Ns=4, Delta f=4, and OH=16.7%.

In an example shown in FIG. 5E, $N_s$=4, Delta f=4, and OH=16.7%. Compared to the case in FIG. 5D, the frequency interval of the common pilot channel is about the same, but the number of time slots into which the common pilot channel is inserted is larger. Therefore, the illustrated example is desirable from the point of view of increasing the tolerance in fluctuation in the frequency and time domains.

Figure 5F:
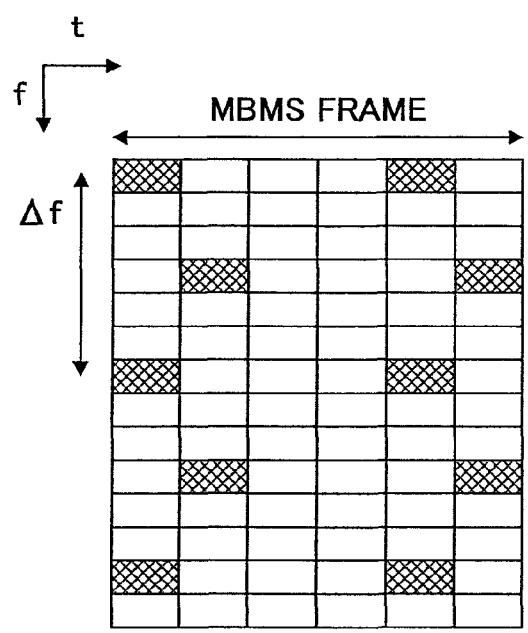
FIG. 5F is a diagram illustrating an example of mapping a common pilot channel to an MBMS frame, where Ns=4, Delta f=6, and OH=11.1%.

In an example shown in FIG. 5F, $N_s$=4, Delta f=6, and OH=11.1%. While common pilot channels are inserted in a large number of time slots in the present example shown, as in the case of FIG. 5E, the frequency interval of the common pilot channel is relatively larger. Thus, the number of common pilot channels inserted into the MBMS frame is smaller. The present example shown is desirable from the point of view of decreasing overhead while keeping the tolerance to fluctuation in the time and frequency domains relatively high.

Figure 5G:
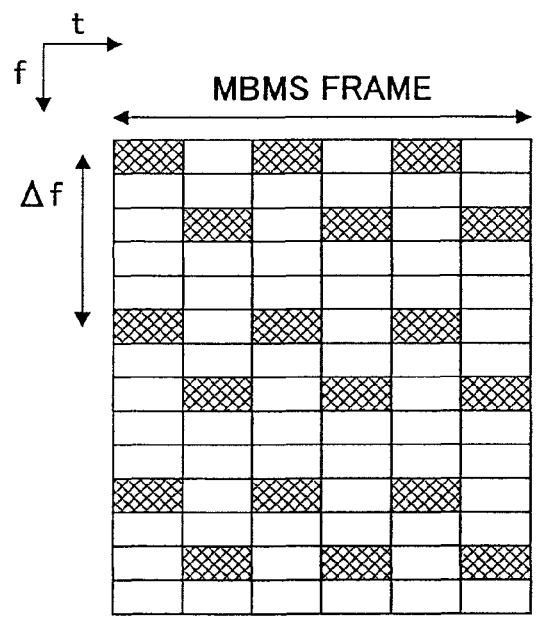
FIG. 5G is a diagram illustrating an example of mapping a common pilot channel to an MBMS frame, where Ns=6, Delta f=5, and OH=20.0%.

In an example shown in FIG. 5G, $N_s$=6, Delta f=5, and OH=20.0%. In the present example shown, while the frequency interval of the common pilot channel is relatively large, the common pilot channel is inserted into all time slots. Therefore, the present example shown is desirable especially from the point of view of increasing the tolerance to fluctuation in the time domain while maintaining the tolerance to fluctuation in the frequency domain to some extent.

Figure 5H:
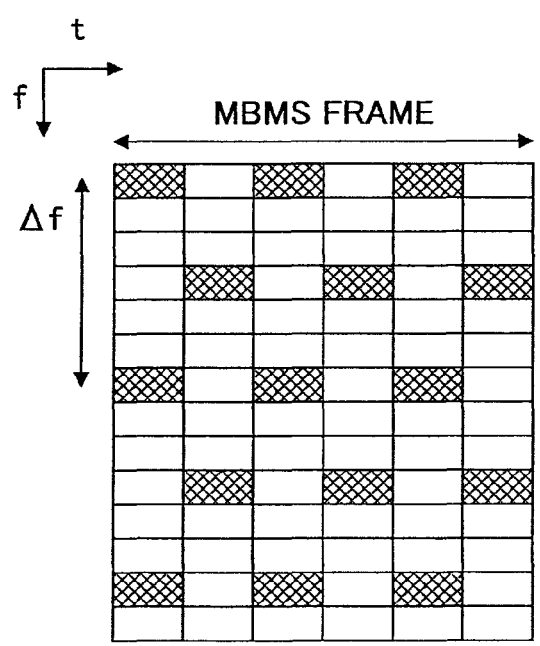
FIG. 5H is a diagram illustrating an example of mapping a common pilot channel to an MBMS frame, where Ns=6, Delta f=6, and OH=16.7%.

In an example shown in FIG. 5H, $N_s$=6, Delta f=6, and OH=16.7%. While common pilot channels are inserted in all time slots in the present example shown, as in the case of FIG. 5G, the frequency interval of the common pilot channel is relatively larger. Thus, the number of common pilot channels inserted into the MBMS frame is smaller. The present example shown is desirable from the point of view of decreasing overhead while keeping the tolerance to fluctuation in the frequency domain relatively high and the tolerance to fluctuation in the time domain especially high.

In the mapping examples as shown in FIGS. 5C, 5D, 5E, and 5H, common pilot channels are distributed relatively uniformly within the MBMS frame. Thus, the examples as described above are desirable from the point of view of achieving uniformity in the interpolation accuracy of the channel estimation values.

Embodiment 2

As described above, the unicast and MBMS frames are time-division multiplex transmitted, with the unicast channel channel-compensated using a specific pilot channel included in the unicast frame and the MBMS channel channel-compensated using a common pilot channel included in the MBMS frame. Thus, with respect to the objective of channel compensating the MBMS channel, the specific pilot channel does not have to be inserted into the MBMS frame.

On the other hand, a user apparatus measures the downlink receive quality in predetermined periods (CQI measurement periods), and reports the measured value to the base station. The receive quality may be expressed in various channel quality indicators (CQI) including SNR, SIR, and SINR. The base station schedules (allocate wireless resources to, determine modulation scheme and channel coding rate, and determine transmit power) a unicast channel to be transmitted next based on the CQI measurement value. Thus, a specific pilot channel for a unicast channel should be inserted into a downlink channel according to at least the CQI measurement frequency. The CQI measurement period may be not more than a subframe (one unicast frame) for a minimum. From such points of view, it is desirable that the specific pilot channel is inserted into the MBMS channel as well.

It is not appropriate to use the common pilot channel already inserted into the MBMS frame to measure the CQI, and schedule the unicast channel using the CQI measurement value thereof. The reason is that, as it is not possible to distinguish cells using only the common pilot cell which is common to multiple cells, it is difficult to evaluate, from the receive quality thereof, the downlink channel state at each specific cell.

In principle, the position at which the specific pilot channel is inserted within the MBMS frame may be anywhere as long as it is at the user apparatus and known. However, when the inserting positions of the specific pilot channel for the unicast and MBMS channels are entirely different, the user apparatus must confirm the frame configuration difference, possibly leading to a complex CQI measurement process. In view of such points as described above, it is desirable to align the inserting positions of the specific pilot channel for the MBMS frame and the unicast channel.

Figure 6A:
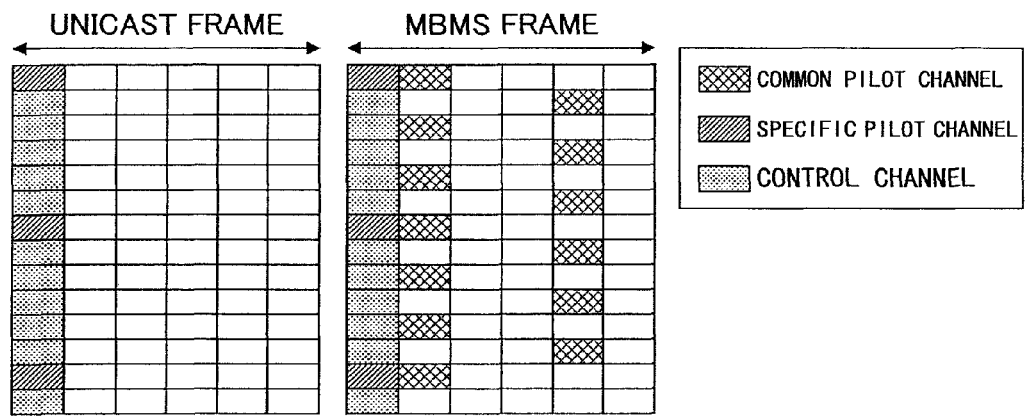
FIG. 6A is a diagram illustrating an example of mapping a specific pilot channel to an MBMS frame.

In the example as shown in FIG. 6A, three specific pilot channels are inserted into the head time slot for the MBMS frame as for the unicast frame. In this way, the user apparatus may extract a specific pilot channel from the head time slot within the frame and perform the CQI measurement without being aware of the frame being the unicast frame or the MBMS frame. This is advantageous also from the point of view of power saving of the user apparatus, and is especially advantageous for a user apparatus which operates in an intermittent reception mode or a DRX (discontinuous transmission) mode.

Figure 6B:
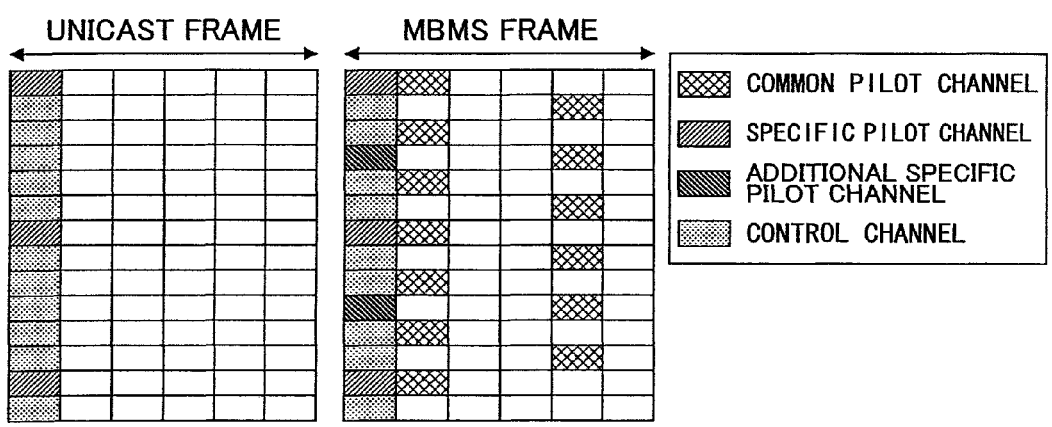
FIG. 6B is a diagram illustrating an example of mapping a specific pilot channel to an MBMS frame.

In an example as shown in FIG. 6B, in addition to three specific pilot channels being inserted into the head time slot for the MBMS frame as for the unicast frame, two further specific pilot channels (additional specific pilot channels) are being inserted into the head time slot. As the inserting frequency of the specific pilot channel is large, this is desirable from the point of view of improving the receive-quality measurement accuracy of the specific pilot channel for the MBMS frame. Moreover, as the additional specific pilot channels are inserted into only the head time slot, the user apparatus may perform the CQI measurement process only for the head time slot as in the case of FIG. 6A. In other words, for the example in FIG. 6B, in addition to the fact that a battery-saving effect may be expected at the same level as in the case of FIG. 6A, a receive-signal quality measurement value which is more accurate than that for the example in FIG. 6A may be expected.

In order to multiplex the L1/L2 control channel to the MBMS frame, it is necessary to insert a cell-specific pilot channel (a specific pilot channel) into the MBMS frame. From the points of view as described above, L1/L2 control channels and specific pilot channel are multiplexed to the MBMS frame in FIG. 6B.

For convenience of explanation, while the specific and the additional specific pilot channels are inserted into the head time slot within the frame, they may be inserted into a different time slot. At least a portion of the specific pilot channels inserted into the MBMS frame may be inserted into the same time slot number and the same frequency (sub-carrier) as the specific pilot channel within the unicast frame. The additional specific pilot channel may further be inserted into the time slot. From the point of view of quickly proceeding with the demodulation process after receiving the pilot channel, it is desirable to have the specific and additional specific pilot channels concentrated in the head time slot.

Embodiment 3

Figure 7:
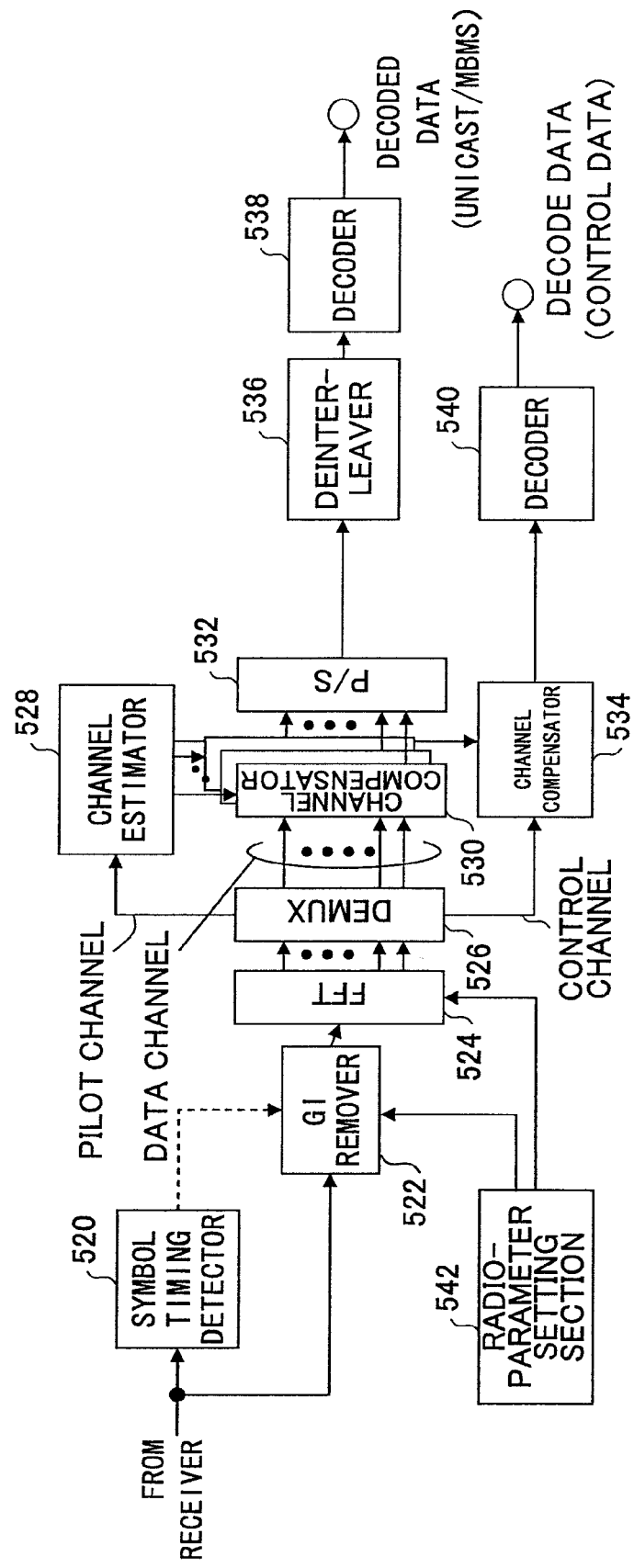
FIG. 7 is a diagram illustrating a receiver according to an embodiment of the present invention.

FIG. 7 is a schematic block diagram of a receiver according to an embodiment of the present invention. Such a receiver as described above is typically provided at a user apparatus such as a mobile station. FIG. 7 illustrates a receiver, including a symbol timing detector 520, a guard interval (GI) remover 522, a fast Fourier transformer 524, a demultiplexer 526, a channel estimator 528, a channel compensator 530, a parallel/serial (P/S) converter 532, a channel compensator 534, a deinterleaver 536, a turbo decoder 538, a Viterbi decoder 540, and a radio-parameter setting section 542.

The symbol timing detector 520 detects a symbol (symbol boundary) timing based on a received signal. The received signal is a signal after undergoing reception, amplification, frequency conversion, bandwidth limiting, orthogonal demodulation, and conversion-to-digital processes.

The GI remover 522 removes, from the received signal, a portion corresponding to the GI.

The fast Fourier transformer 524 fast Fourier transforms a signal input thereto, and demodulates the signal using OFDM.

The demultiplexer 526 separates pilot, control, and data channels multiplexed in the received signal. The separation is performed such that it corresponds to multiplexing at the transmitter (processing in the multiplexer 306 in FIG. 1). As the unicast and MEMS frames are time-division multiplex transmitted, unicast and specific pilot channels are derived in the unicast frame period, while MBMS and common (and specific) pilot channels are derived in the MBMS frame period.

The channel estimator 528 estimates the propagation path condition using a pilot channel and outputs a control signal for adjusting amplitude and phase such that channel fluctuation is compensated. The control signal is output per sub-carrier.

The channel compensator 530 adjusts the amplitude and phase of the data channel per sub-carrier according to information from the channel estimator 528.

The parallel-to-serial (P/S) converter 532 converts a parallel signal sequence to a serial signal sequence.

The channel compensator 534 adjusts the amplitude and phase of the control channel per sub-carrier according to information from the channel estimator 528.

The deinterleaver 536 changes the order of signals in accordance with a predetermined pattern. The predetermined pattern corresponds to an inverse pattern of the change performed in the interleaver at the transmitter (326 in FIG. 1).

The turbo encoder 538 and the Viterbi decoder 540 decode traffic information data and control information data, respectively.

The radio-parameter setting section 542 sets radio parameters to be used in communications, in the same manner as the radio-parameter setting section 320 in FIG. 1. The radio-parameter setting section 542 may compute and derive an appropriate radio parameter group each time, or multiple sets of radio parameter groups may be stored in a memory in advance, whereby sets may be accessed as needed.

A signal received with an antenna undergoes processes within the RF receiver such as amplifying, frequency-converting, bandwidth-limiting, and orthogonal demodulating, and then is converted to a digital signal. A guard-interval removed signal is OFDM demodulated with the fast Fourier transformer 524. The demodulated signal is separated, by the demultiplexer 526, into pilot channels (including common and/or specific pilot channels), control and data (including unicast and MBMS) channels. The pilot channel is input to the channel estimator from which a compensating signal for compensating propagation path fluctuation is output per sub-carrier. The data channel is compensated per sub-carrier using the compensating signal and converted to a serial signal. The order of the converted signal is changed at the deinterleaver 536 in a pattern inverse to the change applied in the interleaver. The signal is then decoded at the turbo decoder 538. Similarly, the control channel is also compensated for channel fluctuation using the compensating signal and, in the Viterbi decoder 540, decoded. Thereafter, signal processing is performed that uses reconstructed data and control channels.

Figure 8:
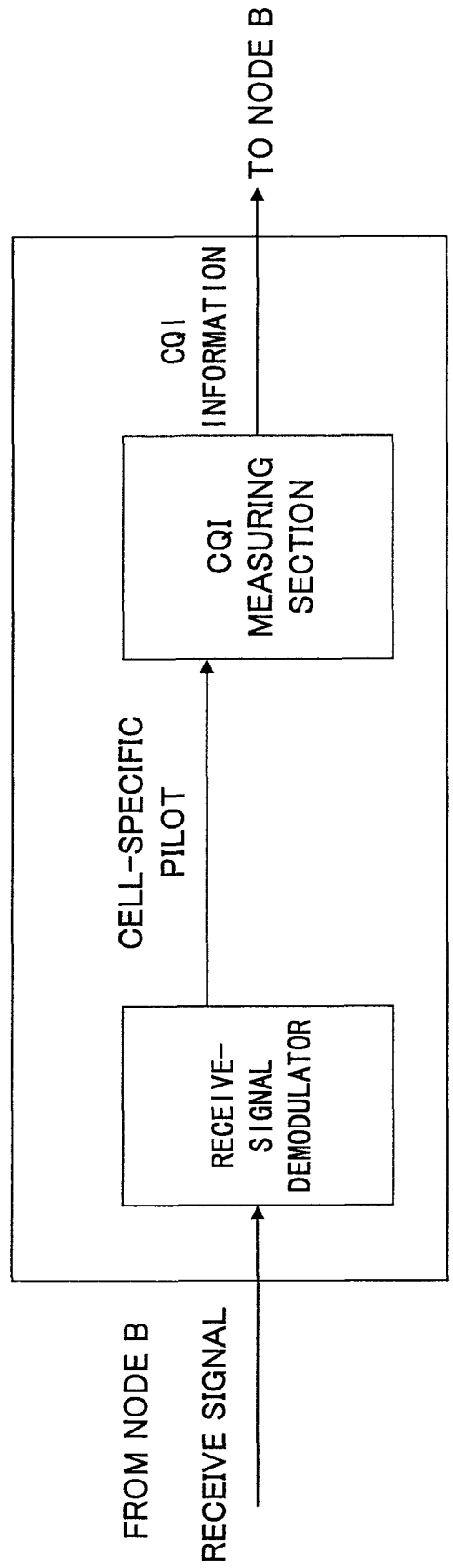
FIG. 8 is a diagram explaining CQI measurement.

FIG. 8 is a first explanatory diagram related to CQI measurement. The illustrated receive signal demodulator corresponds to processing elements (the DEMUX 526, the FFT 524, the GI remover 522, and the symbol-timing detector 520) before the separator (DMUX) in FIG. 7. The CQI measuring section may correspond to an element in the channel estimator 528 in FIG. 7.

As described in the second embodiment, a CQI measurement is performed based on the specific pilot channel not only in the unicast frame but also in the MBMS frame.

Figure 9:
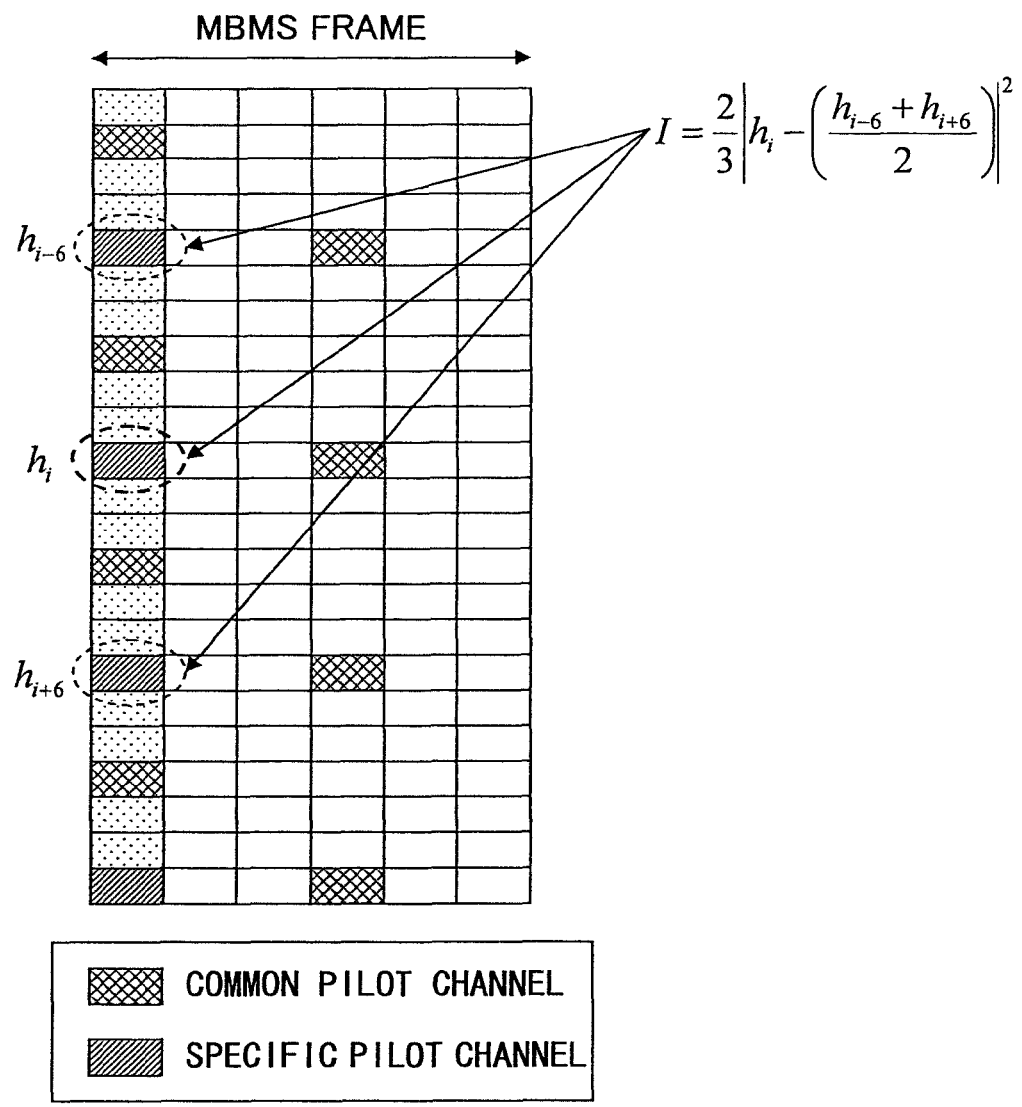
FIG. 9 is a diagram illustrating how specific pilot channels are used to measure the CQI.

FIG. 9 is a diagram illustrating how specific pilot channels are used to measure the CQI. In the example shown, common and specific pilot and control channels are mapped to the head time slot of the MBMS frame, with the MBMS channels being mapped to the second time slot and thereafter (and with the common pilot channels also being mapped to the fourth time slot). In the example shown, the receive signal quality ($CQI_i$) is to be measured for the i-th sub-carrier. In the example shown, three specific pilot channels inserted into the (i−6)-th, the i-th, and the (i+6)-th sub-carriers are used for the CQI measurement. The CQI may be expressed as a ratio of the desired signal power to the non desired signal power. The desired signal power may be derived from a channel estimation value $h_i$ for the sub-carrier i (a signal $s_i$, which is transmitted for the sub-carrier i is received as $h_i s_i$ at the receiver). An interference power I within the non-desired signal power is calculated from the equation in FIG. 9 (Equation 1).

The equation is merely an example, thus the interference power and CQI may be calculated using various schemes. In the above equation, $h_i$ relates to the desired signal power of the i-th sub-carrier, $(h_{i-6}+h_{i+6})/2$ relates to the desired signal power of the i-th sub-carrier that is estimated from desired signal powers of other sub-carriers, and the difference thereof is associated with the interference power.

When the receive-signal quality for the (i+6)-th sub-carrier is to be measured, specific pilot channels inserted into the i-th, (i+6)-th, and (i+12)-th sub-carriers are used.

In this way, in the example shown in FIG. 9, the CQI is measured only based on the specific pilot channels.

Figure 10:
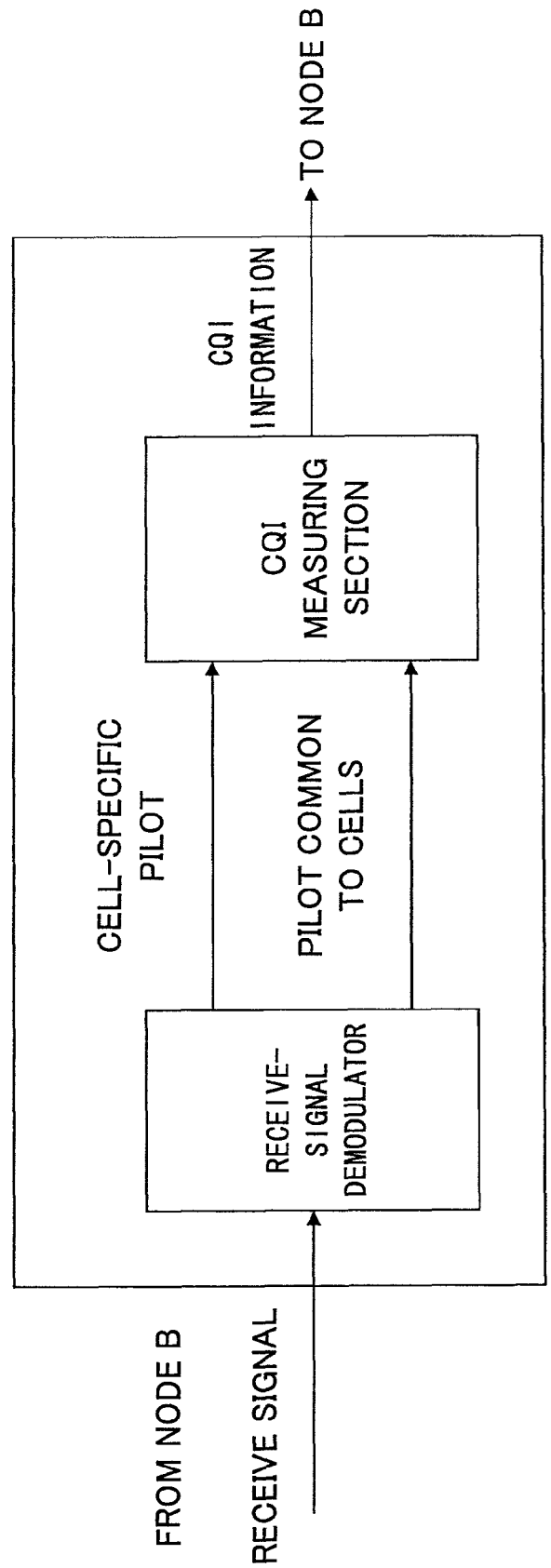
FIG. 10 is another diagram explaining the CQI measurement.

FIG. 10 is another explanatory diagram related to the CQI measurement. The corresponding relationship between a receive signal demodulator and a CQI measuring section in FIG. 10, and elements in FIG. 7 is the same as what is explained with reference to FIG. 9.

Figure 11:
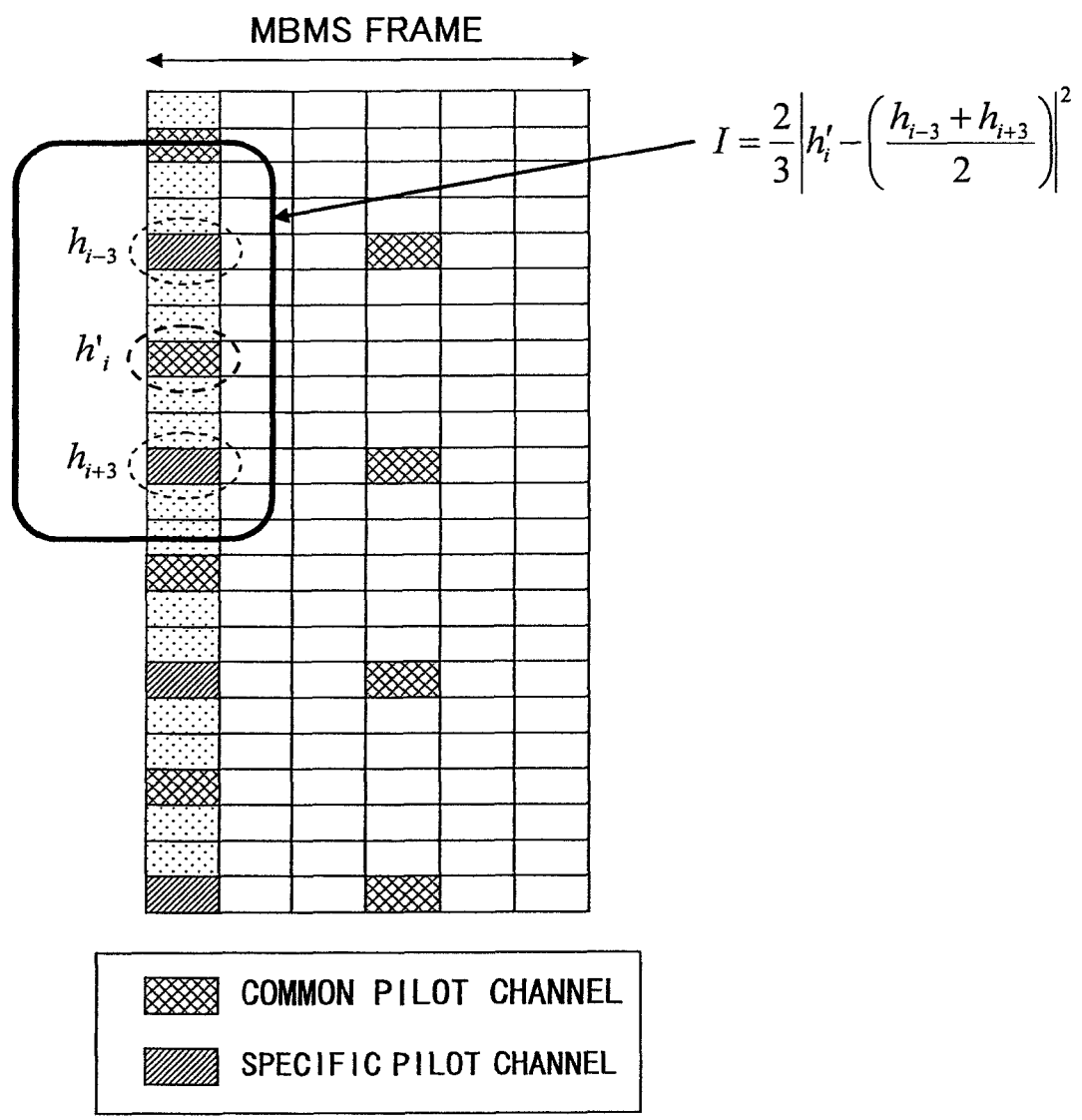
FIG. 11 is a diagram illustrating how specific and common pilot channels are used to measure the CQI.

FIG. 11 is a diagram illustrating how specific and common pilot channels are used to measure the CQI. For convenience of explanation, $h_m$ represents a channel estimation value related to the m-th sub-carrier that is estimated with the specific pilot channel, while $h_n'$ represents a channel estimation value related to the n-th sub-carrier that is estimated with the common pilot channel. Three channel estimation values are used as in the case of FIG. 9. In the example shown in FIG. 11, one channel estimation value $h_i'$ with the common pilot channel and two channel estimation values $h_{i\pm3}$ with the specific pilot channels are used. The desired signal power is derived from the channel estimation value $h_i'$ related to the sub-carrier i. An interference power I within the non-desired signal power is calculated from the equation in FIG. 11 (Equation 2).

The equation is merely an example, thus, the interference power and CQI may be calculated using various schemes. In the above equation, $h_i$ relates to the desired signal power of an i-th sub-carrier, $(h_{i-3}+h_{i+3})/2$ relates to the desired signal power of the ith sub-carrier that is estimated from desired signal powers of other sub-carriers, and the difference thereof is associated with the interference power. As $h_i'$ is a value derived from the common pilot channel, the accuracy may be lower than the value derived from the specific pilot channel. However, as calculation is performed within a relatively narrow frequency range, it is easier to follow the fluctuation in the frequency domain, making it possible to keep the overall CQI measurement accuracy at or above a certain level. While channel estimation values $h_{i\pm6}$, which are 12 sub-carriers apart are used in FIG. 9, channel estimation values $h_{i\pm3}$, which are only 6 sub-carriers apart with the same frame configuration are used in FIG. 11. The example shown in FIG. 11 uses not only the specific pilot channel, but also the common pilot channel, making it possible to measure the CQI in a relatively narrow frequency range and to measure the CQI in the frequency and/or time domain more precisely than in the case of FIG. 9.

Figure 12:
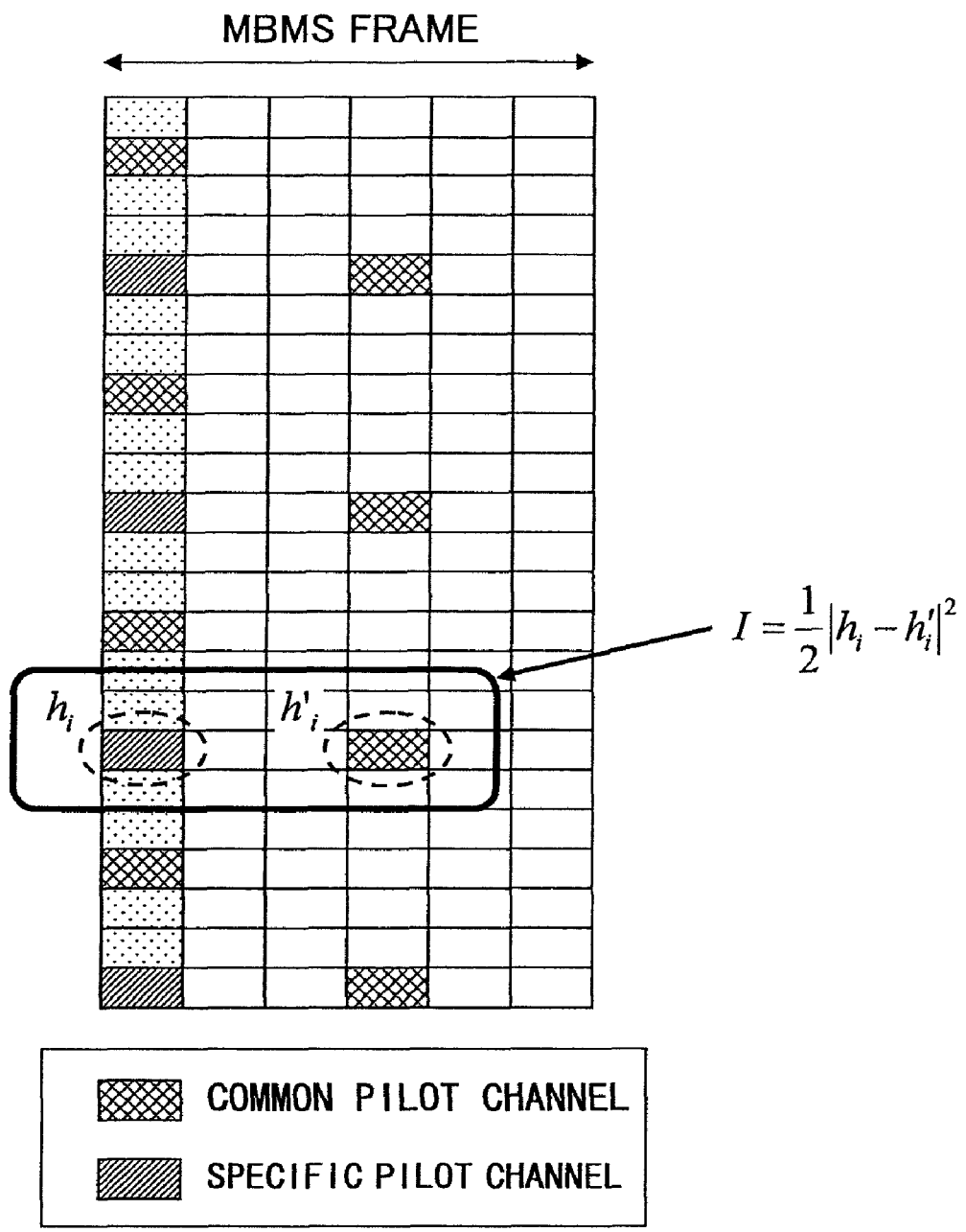
FIG. 12 is a diagram illustrating how specific and common pilot channels are used to measure the CQI.

FIG. 12 shows how specific and common pilot channels are used to measure the CQI in a different manner. Unlike examples shown in FIGS. 9 and 11, channel estimation values $h_i$, $h_i'$ with specific and common pilot channels inserted into the same sub-carrier but different time slots are used in FIG. 12. The desired signal power may be derived from the channel estimation value $h_i$ related to the sub-carrier i. An interference power I within the non-desired signal power is calculated from the equation in FIG. 12 (Equation 3).

The equation is merely an example, thus, the interference power and CQI may be calculated using various schemes. The example shown is desirable from the point of view of appropriately following the temporal channel fluctuation.

The present invention has been described by breaking down into a number of embodiments for the convenience of explanation. However, the breakdown of each of the embodiments is not essential to the present invention, so that one or more embodiments may be used as required.

The present invention is not limited to the above-described preferred embodiments thereof, so that various variations and modifications are possible within the scope of the spirit of the present invention.

The present application claims priority based on Japanese Patent Application No. 2006-12798 filed on May 1, 2006 with the Japanese Patent Office, the entire contents of which are hereby incorporated herein by reference.

The invention claimed is:

1. A receiving apparatus for use with an orthogonal frequency division multiplexing (OFDM) communications system, comprising:
   a unit which receives a transmit symbol to which are multiplexed a unicast channel, a multimedia broadcast multicast service (MBMS) channel, a specific pilot channel specific to a specific cell, and one or more common pilot channels common to a plurality of cells;
   a unit which determines one or more first type of channel estimation values for each of one or more sub-carriers into which the one or more common pilot channels are inserted;

a unit which determines a second type of channel estimation value for each of the one or more sub-carriers into which the one or more specific pilot channels are inserted; and a unit which derives a non-desired signal component from a difference between a channel estimation value for a certain sub-carrier that is derived from the one or more first type of channel estimation values, and the second type of channel estimation values for the sub-carrier, and derives a channel quality indicator (CQI) for the sub-carrier.

2. The receiving apparatus as claimed in claim 1, wherein the channel estimation value for the certain sub-carrier that is derived from the one or more first type of channel estimation values is derived from an average value of the first type of channel estimation value for different sub-carriers.

3. The receiving apparatus as claimed in claim 1, wherein the non-desired signal component is derived from a difference between the first type of channel estimation value and the second type of channel estimation value for the same sub-carrier.

4. A receiving method for use with an orthogonal frequency division multiplexing (OFDM) communications system, comprising the steps of:

receiving a transmit symbol to which are multiplexed a unicast channel, a multimedia broadcast multicast service (MBMS) channel, a specific pilot channel specific to a specific cell, and one or more common pilot channels common to a plurality of cells;

determining one or more first type of channel estimation values for each of one or more sub-carriers into which the specific pilot channel is inserted and a second type of channel estimation value for each of one or more sub-carriers into which the common pilot channel is inserted;

deriving a non-desired signal component from a difference between a channel estimation value for a certain sub-carrier that is derived from the one or more first type of channel estimation values, and the second type of channel estimation value for the sub-carrier, and deriving a channel quality indicator (CQI) for the sub-carrier.

* * * * *